Dec. 10, 1940. D. COLE 2,224,142
PIPE TONG
Filed Nov. 30, 1937 2 Sheets-Sheet 1

DELBERT COLE INVENTOR.
BY Robert M. McManigal
ATTORNEY.

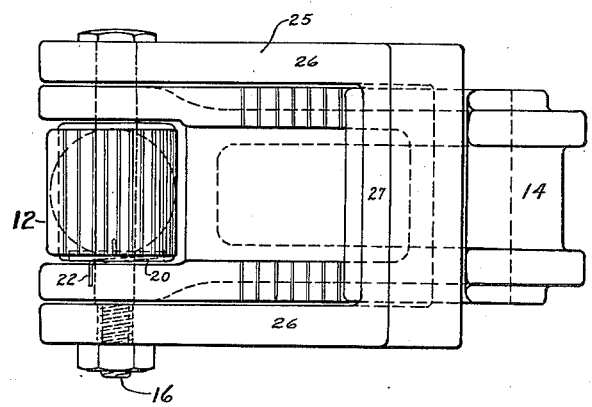
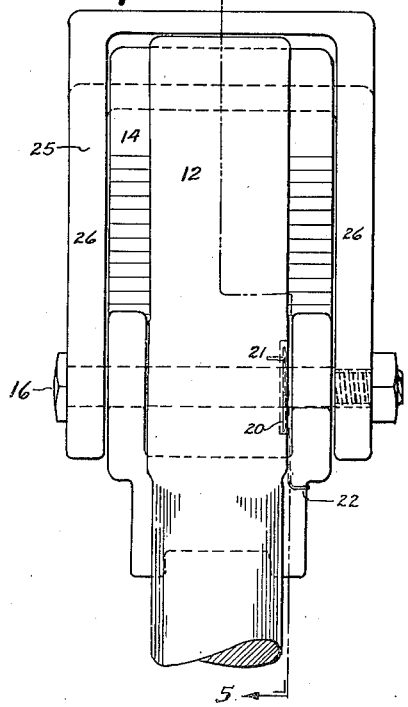
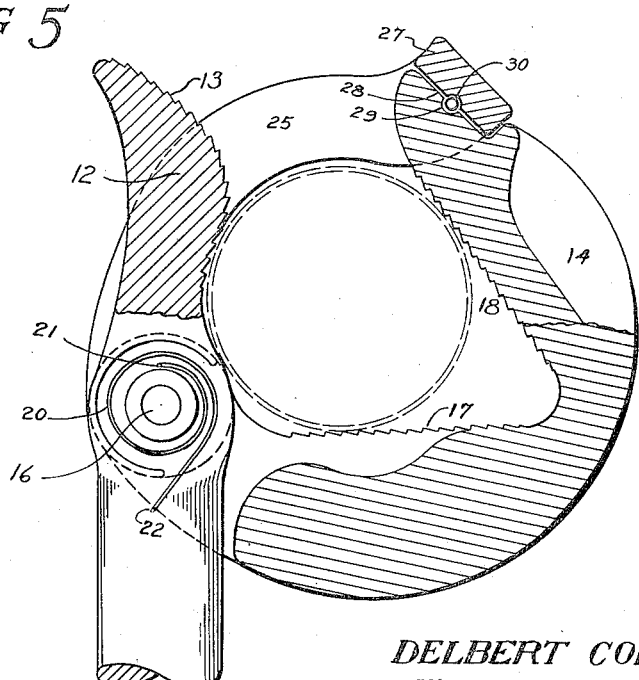

Patented Dec. 10, 1940

2,224,142

UNITED STATES PATENT OFFICE 2,224,142

PIPE TONG

Delbert Cole, Hollydale, Calif.

Application November 30, 1937, Serial No. 177,266

4 Claims. (Cl. 81—99)

This invention relates to pipe tongs for the handling of pipe of all sizes. One application of the invention relates particularly to rotary tongs for the handling of drill pipe, casing pipe, and the like in well drilling rigs.

The rotary and casing tongs now available are adapted to handle pipe having a diameter varying little, if any, over one inch in diameter, and I know of no other rotary or casing tong which is adapted to handle drill or casing pipe varying two inches or more in diameter. It is therefore an object of my invention to provide a rotary or casing tong which is capable of handling different sizes of pipe varying several inches in diameter.

Another object of my invention is to provide a tong which is quick acting, positive in operation, and capable of readily gripping pipe of various sizes at three equi-distant circumferential points. This uniform gripping allows the torque to be distributed equally throughout the pipe, and thereby prevents any deformation of the pipe.

Another object of my invention is to provide a tong which is automatically adjusted to operative position when the pipe is inserted in the tong.

A further object of my invention is to provide a latch for securely maintaining the tong in closed position and which also supports the jaw from deflection.

Another object of my invention is to provide a tong with a supporting arm by means of which the tong may be conveniently lifted. The supporting arm may be mounted on a journal surface of the tong by means of a bearing which allows the tong to be rotated to, or latched in, any desired position.

Another object of my invention is to provide a tong which is of simple and durable construction.

My invention has many other objects, advantages, and features, some of which, with the foregoing, will be set forth at length in the following description where I shall outline one form of the invention, which I have selected for illustration in the drawings accompanying and forming a part of the present specification. In the said drawings, I have shown one form of my invention, but it is to be understood that I do not limit myself to such form, since the invention, as expressed in the claims, may be embodied in a large number of forms.

Referring to the drawings:

Figure 3 is a plan view looking down on the tong in the position shown in Figure 5.

Figure 4 is a side view looking into the device from the left in the position shown in Figure 5.

Figure 5 is a sectional view of the device taken along the line 5—5 of Figure 4.

Figure 1:
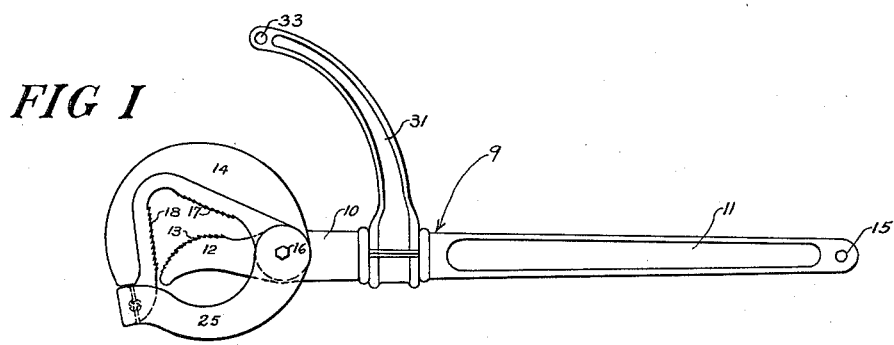
Figure 1 is a front elevation showing a complete assembly of a preferred form of the tong of my invention.
Figure 2:
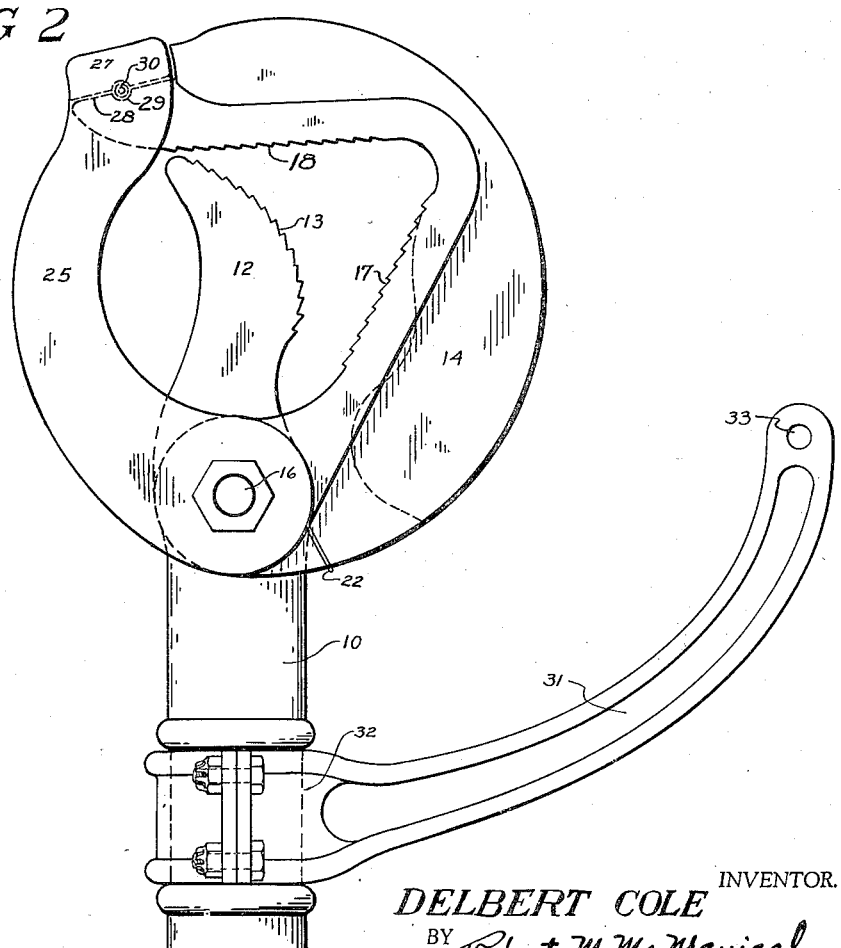
Figure 2 is an enlarged front elevation of the device shown in Fig. 1.

In Figures 1 to 5 inclusive, I have chosen a rotary tong 9 of the type which is used to handle drill pipe, casing pipe, and the like in well drilling rigs as illustrative of one form of my invention.

The rotary tong 9 consists of a body member 10 one end of which is in the form of a handle 11, and the other end of which is in the form of a cam 12, which is provided with gripping surface 13, and a jaw 14 which is pivotally mounted on the body member.

The end of the handle 11 may be provided with an opening 15 so that the tong can be operated by the conventional cat-line (not shown) in the usual manner. A pin 16 is secured in the body member 10 near the cam 12 and the jaw 14 is pivotally mounted on said pin. The jaw is provided with gripping surfaces 17 and 18 respectively, which are at an angle of sixty degrees with respect to each other.

The curvature of the gripping surface 13, is determined by the location of the pin 16, and is such that the point of contact of said surface with a pipe inserted in the tong lies in a line which is perpendicular to the line which bisects the angle formed by the gripping surfaces 17 and 18. This is true regardless of the size of the pipe which is inserted in the tong. The pipe in the tong will be gripped at three equi-distant circumferentially spaced points, and therefore cannot be deformed since the torque is equally distributed throughout the pipe.

Also mounted on the pin 16 is a spring 20, one end of which is fastened to the tong as indicated by the numeral 21 in Figure 5. The other end 22 of the spring is secured to the jaw 14. The spring 20 is adapted to urge the jaw 14 into closed position when the jaw is released.

The tong 9 may also be provided with a latch member 25 which may also be pivotally mounted on the pin 16. The latch member 25 may consist of a pair of bifurcated arms 26, the end portions of which are connected together as shown at 27. The end of the jaw 14 is provided with a shoulder 28 and a recess 29. The latching surface 27 of the latch member 25 is adapted to extend over the end of the jaw 14 and engage the shoulder 28. A spring 30 is mounted in the latching surface 27 and is adapted to engage the recess 29 in the end of jaw 14 to hold the tong in closed position.

The tong 9 may also be provided with a supporting arm 31 for convenience in handling the tong. The body member 10 may be provided with a journal surface 32 on which the supporting arm 31 may be mounted by means of a bearing surface. The other end of the supporting arm 31 is provided with an opening 33 so that the tong may be supported by the usual cat-line.

The supporting arm is preferably journaled on the body member 10 as near to the head of the tong as the jaw 14 when opened will permit and is preferably so curved that the opening 33 is directly in line with the center of gravity of the complete tool. By mounting the supporting arm 31 around the journal surface 32 the tong can be rotated to any desired position.

To position the tong around any size of pipe which the tong is adapted to handle, the jaw 14 is pushed back and placed around the pipe 35 and upon release of the jaw 14, the spring 20 urges the jaw into operative position, and the pipe is automatically gripped at three equi-distant circumferentially spaced points. The latch member 25 is then raised until its latching surface 27 engages the shoulder 28 of the jaw 14 and spring 30 drops into the recess 29, thereby holding the tong in closed position.

To open the tong the latch member 25 is pulled until the latching surface 27 no longer engages any part of the jaw 14, at which time the jaw 14 is also pulled back disengaging the pipe.

One rotary tong designed in accordance with the above disclosure, is capable of handling all sizes of pipe between two and eight inches in outside diameter, and in each instance the pipe, is gripped in the tong at three equi-distant circumferentially spaced points.

Although the best results can only be obtained by having the gripping surfaces 17 and 18 at an angle of sixty degrees to each other, satisfactory results can be obtained if the angle between said gripping surfaces does not vary more than a few degrees. This is particularly true in the smaller sizes of tongs, for example, the sizes which are adapted to handle only pipe of three inches in diameter or less.

Similarly, the best results can only be obtained by having the gripping surface 13 of the cam 12 of such curvature that every point of contact of said surface with a pipe inserted in the tong lies in a line which is perpendicular to the line which bisects the angle formed by the gripping surfaces of the jaws of the tong. However, satisfactory results can be obtained if the curvature of said surfaces is substantially as outlined above. This again, is particularly true in the smaller sizes of tongs.

From the foregoing description taken in connection with the accompanying drawings, advantages of the construction and method of operation will be readily understood by those skilled in the art to which the invention appertains, and while I have described the principle of operation, together with the form which I now consider to be the best embodiment thereof, I desire to have it understood that the article shown is merely illustrative and that the invention is not to be limited to the details disclosed therein but is to be accorded the full scope of the appended claims.

I claim:

1. A pipe tong adapted to grip any size of pipe inserted therein at three substantially equi-distant circumferentialy spaced points comprising a body member having a handle at one end and a gripping surface at the other end, a pin secured in said body member near said gripping surface, a jaw pivotably mounted on said pin, gripping surfaces in said jaw at an angle of approximately sixty degrees with respect to each other, the curvature of said first mentioned gripping surface being such that every point of contact with said surface of a pipe in said tong lies in a line which is perpendicular to the line which bisects the angle formed by said gripping surfaces in said jaw, spring means for urging said jaw into closed position, and a latch member mounted on said pin for engaging the free end of said jaw for closing the jaw and holding the free end of the jaw against deflection.

2. A pipe tong adapted to grip any size of pipe inserted therein, comprising a body member having a handle at one end and a curved gripping surface at the other end portion, a pin secured in said body member near said gripping surface, a jaw pivotally mounted on said pin, gripping surfaces on said jaw at an angle with respect to each other and facing said curved gripping surface, and a latch member mounted on said pin for engaging the free end of said jaw to close the jaw and to hold the free end of the jaw against deflection.

3. A pipe tong adapted to handle several sizes of pipe comprising a handle having a curved gripping surface at the outer end thereof, a jaw, means for pivotally mounting the jaw on said handle near said gripping surface, gripping surfaces on said jaw at an angle of approximately 60° to each other, the curvature of said first mentioned gripping surface and the location of said gripping surfaces of said jaw being such that any pipe inserted in said tong will be held at three substantially equi-distant circumferentially spaced points, and a latch member mounted on the pivot means for said jaw for engaging the free end of said jaw for closing the jaw and for holding the free end of the jaw against deflection.

4. A pipe tong adapted to handle several sizes of pipe comprising a handle having a curved gripping surface at the outer end thereof, a pin secured in said handle near the gripping surface, a jaw pivotally mounted on said pin, gripping surfaces on said jaw at an angle of approximately 60° to each other, the curvature of the first mentioned gripping surface and the location of said gripping surfaces on said jaw being such that the pipe inserted in said tong will be held at three substantially equi-distant circumferentially spaced points, and a latch member mounted on said pin for engaging the free end of said jaw for closing the jaw and for holding the free end of the jaw against deflection.

DELBERT COLE.